United States Patent [19]
Krieger

[11] Patent Number: 5,982,138
[45] Date of Patent: Nov. 9, 1999

[54] PORTABLE ELECTRICAL ENERGY SOURCE

[75] Inventor: Michael Krieger, Miami Beach, Fla.

[73] Assignee: Vector Manufacturing, Ltd., Hollywood, Calif.

[21] Appl. No.: 09/213,265

[22] Filed: Dec. 17, 1998

[51] Int. Cl.⁶ ........................................................ H02J 7/00
[52] U.S. Cl. ............................................ 320/105; 320/104
[58] Field of Search .................................... 320/104, 105, 320/115

[56] References Cited

U.S. PATENT DOCUMENTS

| | | | |
|---|---|---|---|
| 5,077,513 | 12/1991 | Dea et al. | 320/115 |
| 5,083,076 | 1/1992 | Scott | 320/105 |
| 5,793,185 | 8/1998 | Prelec et al. | 320/104 |

Primary Examiner—Peter S. Wong
Assistant Examiner—Lawrence Luk
Attorney, Agent, or Firm—Venable; Robert Kinberg

[57] ABSTRACT

A portable electrical energy source includes a portable housing having an outer surface and defining an interior space. A direct current battery is disposed in the interior space. A direct current socket is supported on the housing and electrically coupled to the battery for supplying direct current from the battery to a device outside the housing. An inverter is provided for converting direct current into alternating current and includes an electrical lead have a male plug adapted for being electrically connected to the battery via the direct current socket and an electrical outlet for supplying alternating electrical current to a device outside the housing. The inverter is removably attached to the outer surface of the housing so that the inverter can be ported together with the battery inside the housing and selectively separated from the housing and used independently of the battery in the housing.

14 Claims, 4 Drawing Sheets

PORTABLE ELECTRICAL ENERGY SOURCE

BACKGROUND OF THE INVENTION

The invention relates to a portable electrical energy source.

Portable electrical energy sources are known for providing direct current for jump starting an automobile, boat or other vehicle as well as for providing direct current for energizing various appliances. For example, a jump start system providing a 12-volt, 400 ampere power supply is manufactured and distributed by Vector Manufacturing, Ltd., of Hollywood, Fla. under the trade name PRO-CHARGE-900. In this jump start system, a heavy-duty 12-volt battery is arranged inside an impact-resistant polyethylene case. Heavy duty No. 4 industrial booster cables attached to the battery extend through the case and are attached to heavy duty 400 amp booster clamps which, when not in use, can rest on shoulders molded on the case. Dc appliances may be plugged into a DC outlet socket mounted in the casing and coupled to the battery. The jump start battery can be charged by a car battery via a DC/DC power cord provided with a male plug adapted to be inserted into the cigarette lighter of an automobile. The jump start battery may also be charged via an appropriate AC adapter/charger.

Power inverters are known which convert direct current into alternating current. For example, Vector Manufacturing, Ltd. also manufactures and distributes a self-contained power inverter under the trade name POWER FORCE 140 which plugs directly into a cigarette lighter socket or other 12-volt power source for converting 12-volt direct current energy to 110-volt alternating current. The PRO-CHARGE-900 jump start system also includes a cigarette lighter socket so that a power inverter such as the POWER FORCE 140 may be plugged into the jump start system. In such a configuration, the jump start system can provide either 12-volt direct current or 110-volt alternating current. A disadvantage of this configuration is that by having two separate components, they are separately portable and both may not be readily at hand when it is desired to use them together to furnish DC power to the inverter to produce alternating electrical power.

Jump start systems are known wherein a power inverter is included within the impact resistant casing along with the 12-volt battery to provide a portable jump start system which provides both a 12-volt direct current power supply and a 110-volt alternating current supply. While the integration of the power inverter along with the 12-volt battery inside the impact resistant casing has the advantage of providing a portable electrical power source that provides both AC and DC electrical energy, it is a disadvantage that the power inverter cannot be separated from the jump start system and used independently. For example, it would be desirable if the inverter of the portable jump start system could be plugged into the cigarette lighter socket of an automobile to produce alternating current off the automobile battery.

SUMMARY OF THE INVENTION

It is an object of the invention to eliminate the foregoing disadvantages by providing a combined portable electrical energy source for providing both AC and DC electrical energy in which the power inverter may be used independently of the DC battery in the portable system.

The above and other objects are accomplished according to the invention by the provision of a portable electrical energy source which includes a portable housing having an outer surface and defining an interior space; a direct current battery disposed in the interior space; a direct current socket supported on the housing and electrically coupled to the battery for supplying direct current from the battery to a device outside the housing; an inverter for converting direct current into alternating current, the inverter including an electrical lead having a male plug adapted for being electrically connected to the battery via the direct current socket and an electrical outlet for supplying alternating electrical current to an alternating current device outside the housing; and means for removably attaching the inverter to the outer surface of the housing so that the inverter can be ported together with the battery and selectively separated from the housing and used independently of the battery within the portable housing.

In one embodiment of the invention, the battery is a 12-volt DC battery and booster cables are electrically coupled to the battery for jump staring a weak vehicle battery.

According to various aspects of the invention, the attaching means may slidably receive the inverter on the outer surface of the housing, or the attaching means may comprise a snap-on connection, or a pocket attached to the outer surface of the housing for removably receiving the inverter. Other mechanisms for removably attaching the inverter to the outer surface of the portable housing will be apparent to those skilled in the art. As another example, the inverter could be attached to the outer surface of the housing via VELCRO or other type of releaseable connection.

According to further embodiments of the invention, the mechanism for attaching the inverter to the housing may be molded or otherwise provided directly on the outer surface of the housing, or be retrofitted onto the housing by way of a panel which incorporates the attaching mechanism and which is fixable to the outer surface of the housing.

The housing may be rigid, for example, made of an impact resistant polyethylene plastic. Alternatively, the housing may be of a flexible material which, in effect, forms a bag for enclosing the DC battery. In this case, the mechanism for attaching the inverter to the exterior surface of the housing (bag) could be in the form of a pocket sewed onto the exterior surface of the bag.

It is also advantageous to provide the housing with a holder for the plug of the power inverter so that the plug can be properly stowed when not in use. A form fitting recess for the plug can be molded directly into the outer surface of the rigid housing or into a panel which is retrofitted onto the housing. When the housing is in the form of a bag comprised of flexible material, the holder for the plug may take the form of a pocket sewn or otherwise adhered onto the outer surface of the bag. In the case of the housing in the form of a flexible bag, it is preferable for the bottom of the bag to be fitted with a rigid support for supporting the battery. Furthermore, in a preferred form of this embodiment, an interior space is provided below a closeable opening at the top of the bag and above the battery to provide a space for stowing tools. This space can also be utilized for stowing battery booster cables. Preferably, holsters are also provided within the interior space for stowing battery cable clamps.

According to yet another embodiment of the invention, the housing, battery and inverter are of such size and weight as to constitute a belt pack or shoulder bag, and a belt or shoulder strap is attached to the bag to assist a person in porting the bag. In this embodiment of the invention, the battery may comprise, for example, a 12-volt, 3 amp-hour (up to 7 amp) battery and the inverter, a 50 watt (up to 100 watt) inverter, the combination preferably weighing not more than about 5 pounds, for supplying electrical energy to appliances having a relatively low energy requirement.

Further features and advantages of the invention will become apparent from the following detailed description with reference being made to the accompanying drawings.

DETAILED DESCRIPTION OF THE INVENTION

Figure 1:
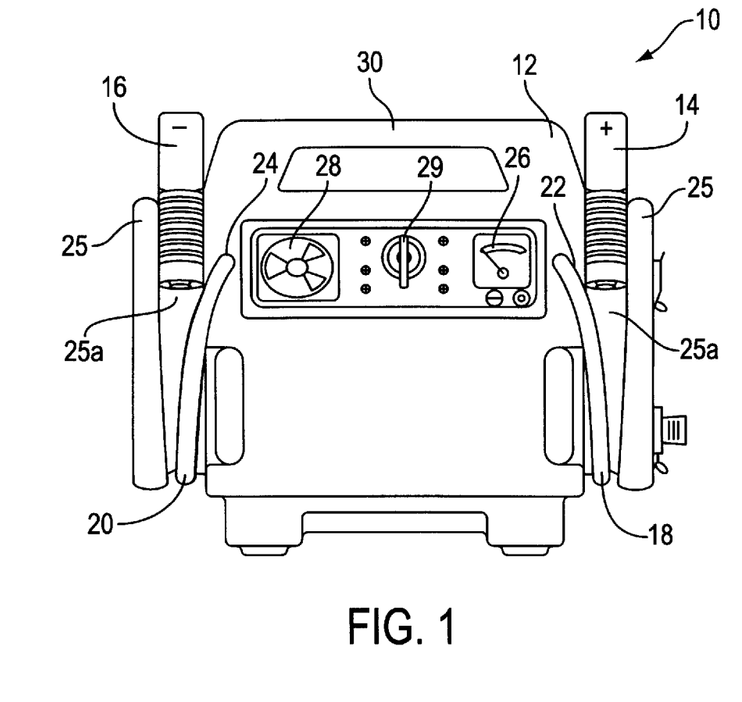
FIG. 1 is a front elevational view of a known portable electric power source.

Referring to FIG. 1, there is shown a known jump start system 10 which includes an impact resistant polyethylene case 12 enclosing a heavy-duty 12-volt power supply (not shown) which has its positive and negative poles coupled, respectively to positive and negative booster clamps 14 and 16 via respective battery cables 18 and 20 which extend through openings 22 and 24, respectively in casing 12. Casing 12 includes molded on shoulders 25 provided with a groove 25a in which booster clamps 14 and 16 are intended to rest when not in use. The front elevational view of FIG. 1 additionally shows a battery condition indicator gage 26, a built-in work emergency light 28 and a safety on/off switch 29 for electrically connecting/disconnecting the battery cables to the battery. Jump start system 10 is portable and for this purpose includes a handle 30 so that the system can be easily ported from place to place.

Figure 2:
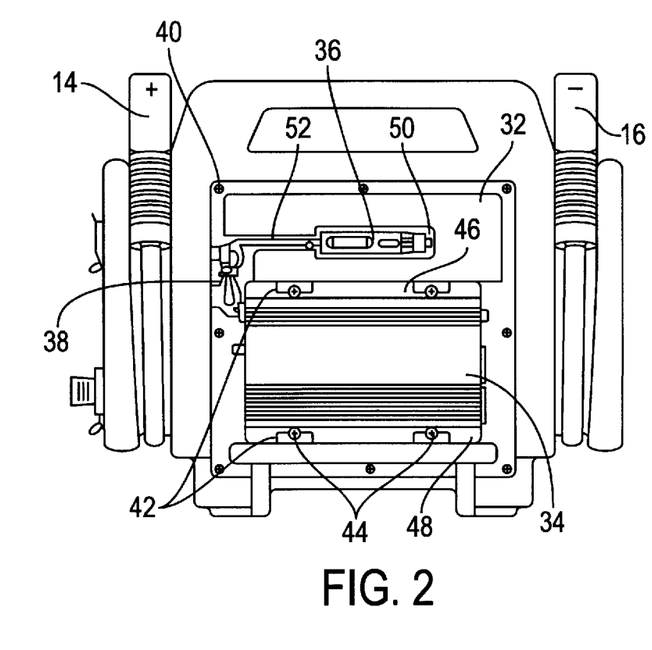
FIG. 2 is a back elevational view of the portable electric power source shown in FIG. 1 retrofitted with a panel for removably holding a power inverter according to the principles of the invention.

FIG. 2 shows a back elevational view of the jump start system shown in FIG. 1 which incorporates, according to the invention, a panel 32, which may be a plastic injection molded product and which is shaped and adapted to removably hold a power inverter 34 and a power inverter plug 36 which is attached to the power inverter via an electrical lead 38. Panel 32 is fixed to casing 10, for example, by screws 40 spaced around an edge of panel 32. Other mechanisms for attaching panel 32 to the outer surface of casing 12 will be apparent to those skilled in the art, for an adhesive could be used. As shown in FIG. 2, a plurality of upper and lower strips 42 are attached to panel 32 by screws 44. Power inverter 34 has upper and lower lips 46 and 48, respectively, which can be slid between strips 42 and panel 32 when screws 44 are loosened. Once in place, the power inverter may be secured in place by tightening screws 44. Panel 32 is appropriately molded to provide a recess 50 for plug 36 and a connecting recess 52 to accommodate a region of lead 38 adjacent plug 36.

It should be obvious to a person skilled in the art that power inverter 34 together with its plug 36 and lead 38 may be removable secured to the outer surface of casing 10 via a retrofitted panel 32 such as illustrated in the embodiment of FIG. 2, or alternatively, the outer surface of casing 12 may itself be specially molded and adapted to removably hold the power inverter together with its plug and lead.

Figure 3:
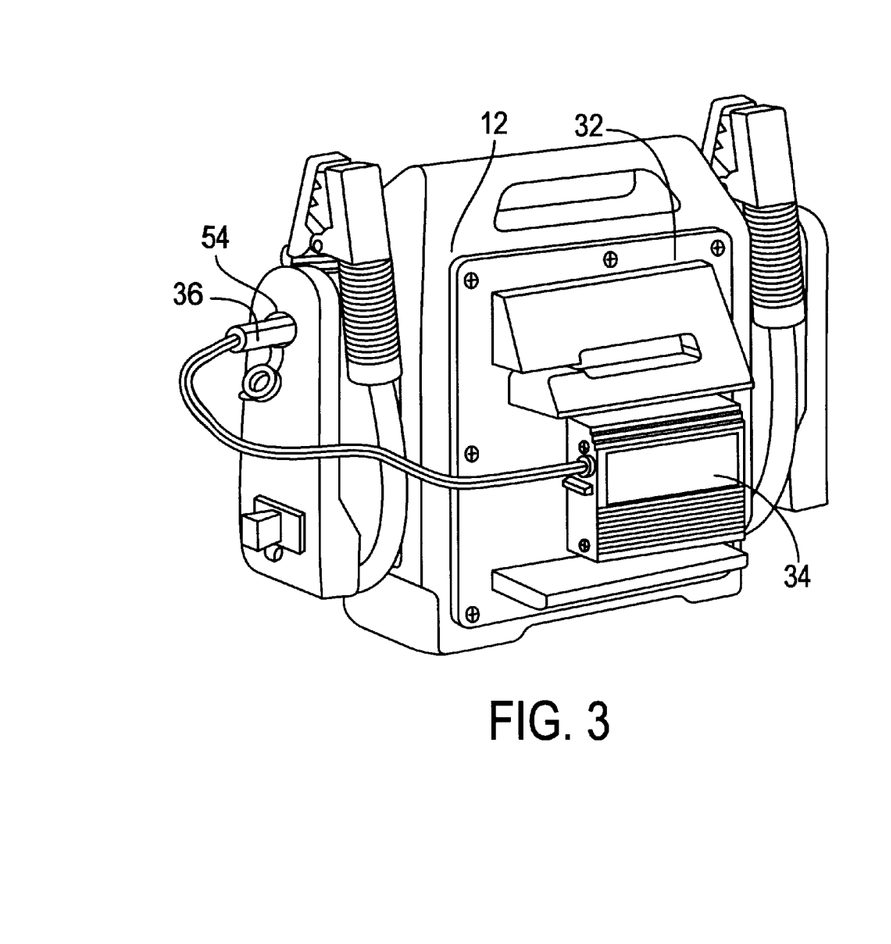
FIG. 3 is a perspective view of a side and back of the power inverter in an operative condition.

FIG. 3 shows a perspective view of the side and back of jump start system 10 adapted with a panel 32 in accordance with the invention, wherein the removably secured power inverter 34 has its plug 36 inserted into a female receptacle 54 which is electrically coupled to the battery (not shown) within casing 12, for supplying the DC electrical energy of the battery to power inverter 34.

Figure 4:
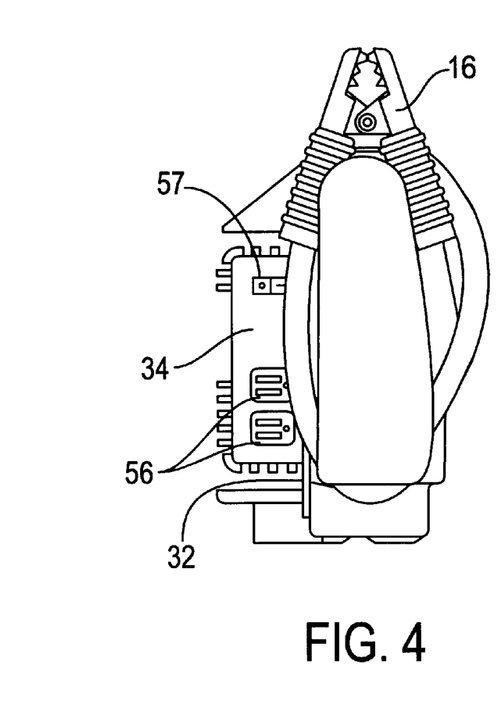
FIG. 4 is a right side elevational view of FIG. 2.

FIG. 4 shows a side view of the jump start system 10 with the attached power inverter where standard alternating current receptacles 56 and an inverter on/off switch 57 are illustrated. The power inverter converts the DC electrical energy of the battery to alternating electrical energy which is coupled to the receptacles 56, so that, for example, a 12 volt DC battery can be used to supply 110 volt alternating current wherever it is needed due to the portable nature of the system.

The principles of the invention may be implemented in connection with any portable DC power supply but is particularly useful in connection with a portable jump start system for jump starting cars, trucks, boats and other vehicles. A variety of jump start systems are commercially available which can be retrofitted with a panel of the type described above. Once such system is the above-mentioned PRO-CHARGE-900 manufactured and distributed by Vector Manufacturing, Ltd., Hollywood, Fla. Additionally, a variety of commercially available power inverters are known which can be utilized in implementing the invention, such as the above mentioned POWER FORCE-140, also manufactured and distributed by Vector Manufacturing, Ltd. In the illustrated embodiment, the power inverter is provided with a lip for being slidably received between strips 42 and panel 32. However, other mechanisms for removably attaching the power inverter are possible within the principles of the invention which would not require such lips. For example, the panel 32 or alternatively, the outer surface of casing 12, could be molded to provide a recess similar to that of recess 50 for receiving the power inverter with a friction fit. Another possibility is to provide a snap connection between the power inverter and panel 32 or the outer surface of casing 12. A VELCRO connection is also conceivable. Any other mechanism for removably securing the power inverter to the outer surface of casing 12 is conceivable within the principles of the invention and will be apparent to those skilled in the art.

The invention provides the advantage of easily porting the power inverter together with the DC battery supply to provide a combined AC/DC power source. When desirable, the power inverter can be easily removed from the casing 12 and utilized separately from the jump start system, for example, by inserting plug 36 into the cigarette lighter receptacle in an automobile to provide alternating current.

Figure 5:
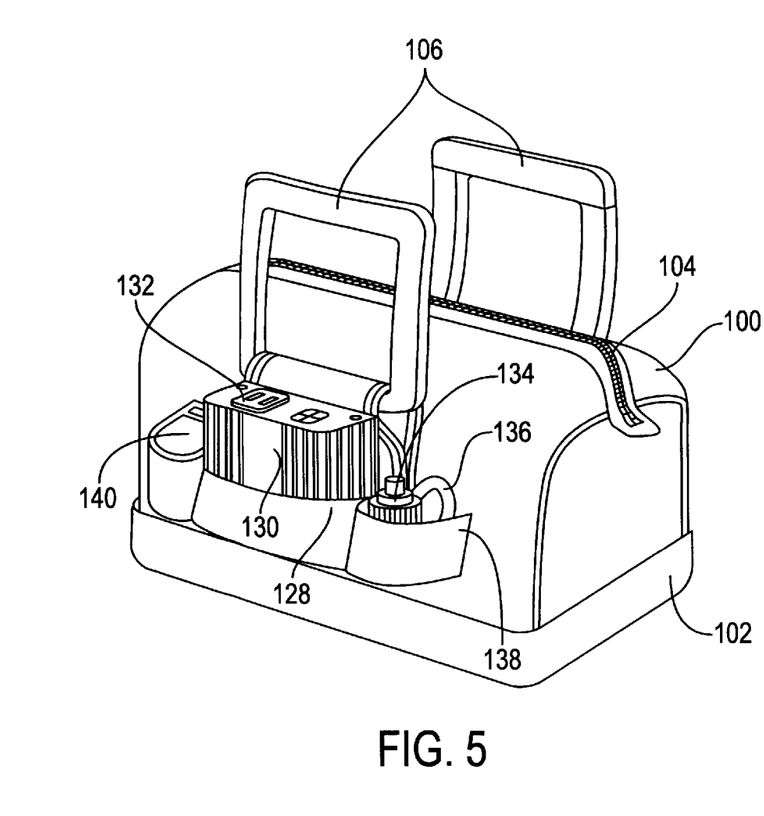
FIG. 5 is a perspective view of a portable electric power source according to another embodiment of the invention.
Figure 6:
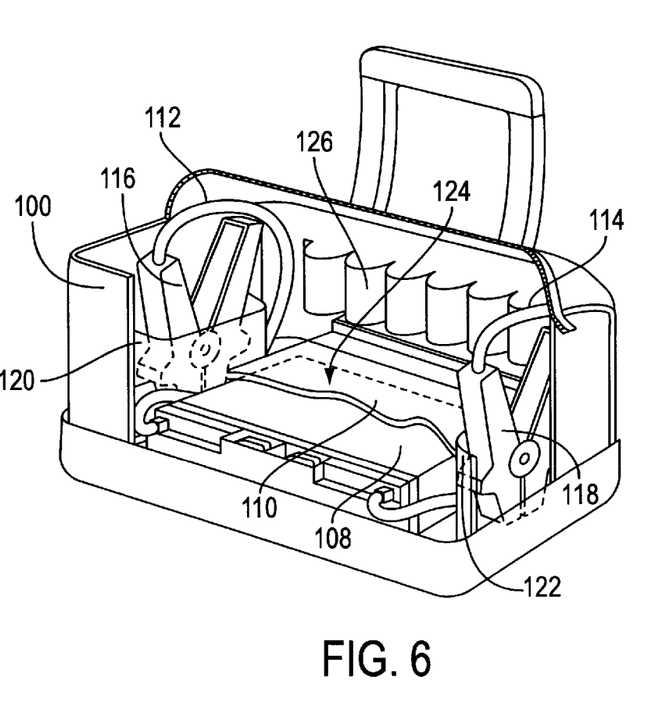
FIG. 6 is a perspective view partially cut away of the portable electric power source of FIG. 5.

FIGS. 5 and 6 show another embodiment of the invention. In this embodiment, the housing for the portable electric power source is in the form of a bag 100 comprised of a flexible, yet heavy duty material, such as a reinforced fabric or leather. A rigid tray 102, made for example, of heavy-duty plastic or metal, is attached to the bottom of bag 100 to provide a reinforcing support for the load to be carried by the bag. The top of bag 100 is provided with a zipper 104 for opening and closing the bag. Handles 106 are attached to the bag so that the bag can be carried by hand. The partially cutaway view of FIG. 6 shows the interior of bag 100 wherein there is provided a DC battery 108 which sits on the bottom of the bag, preferably in a pocket 110 to hold the battery in place. Battery 108 has battery cables 112 and 114 attached to its terminals. The battery cables 112 and 114 are attached at the remote ends to booster clamps 116 and 118, respectively, which are stowed in holsters or pockets 120 and 122, respectively, which are sewn or glued to the interior surface of the bag. As clearly visible in FIG. 6, there is an interior space 124 provided above the battery and below the zippered top of the bag for the purpose of storing and transporting tools. Additionally, loops 126 may be sewn, glued or otherwise fixed to the interior surface of the bag to provide fixed storage spaces for elongated tools such as screw drivers, wrenches, plyers, etc.

Referring again to FIG. 5, there is shown attached to the exterior surface of bag 100 a first pocket 128 which is adapted to removably receive a power inverter 130 which has an exposed conventional AC outlet 132. A male plug 134, attached to power inverter 130 via a lead 136 is stored in a second pocket 138 and in operation can be plugged into a corresponding female receptacle 140 which is electrically coupled to battery 108 to furnish DC electrical energy to the inverter.

As in the embodiment of FIGS. 1–3, power inverter 130 together with its plug and cord can be ported and used with the battery stored within bag 100 or, alternatively, can be removed from the pocket and used separate and apart from the battery within the bag. obviously, other types of mechanisms will be apparent to those skilled in the art for removably holding or securing the power inverter, including its cord and plug, to the outer surface of the bag in accordance with the principles of the invention.

Figure 7:
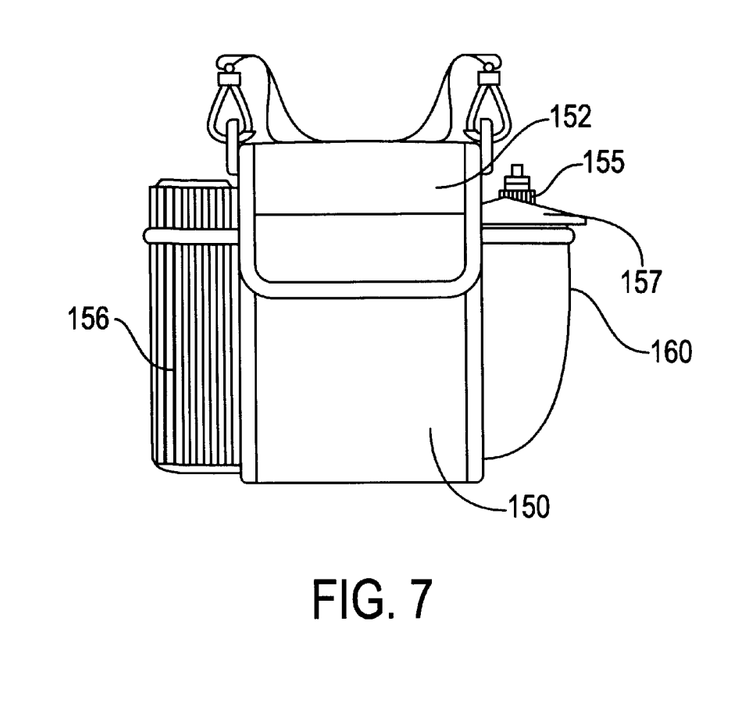
FIG. 7 is a front elevational view of a portably electric power source according to a further embodiment of the invention.
Figure 8:
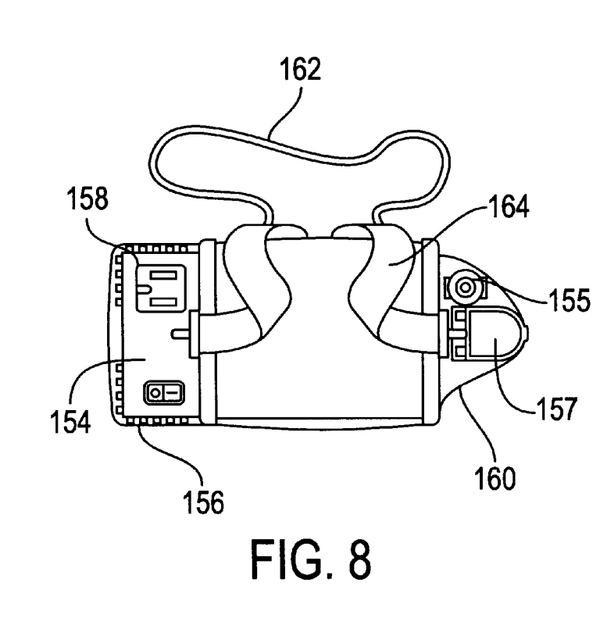
FIG. 8 is a plan view of the embodiment shown in FIG. 7.

FIGS. 7 and 8 show yet another embodiment of a portable electric power source employing the principles of the invention. In this embodiment, the battery and inverter are both smaller in size and produce lower levels of energy and thus can be placed in a belt pack or shoulder bag which can either be worn around the waist of a person or carried by way of a shoulder strap. In this embodiment, a battery such as a 12-volt, 3 amp-hour battery (not shown) is placed in a flexible pouch 150 made for example of plastic, leather or cloth, which is covered by a flap 152 to secure the battery in place. An inverter, such as a 50 watt inverter 154 commercially available from Vector Manufacturing, Ltd., under the trade name POWER FORCE-50, is removably inserted into a pocket 156 sewn or otherwise attached to a side of pouch 150. Inverter 154 is electrically coupled to the battery within pouch 150 to provide alternating current via a standard AC outlet 158. A male plug 155 connected to inverter 154 by a lead (not shown) may be plugged into a 12-volt DC female socket which in FIGS. 7 and 8 is shown covered by a protective lid 157. The plug and socket are stored in yet another pocket 160 sewn or otherwise attached to an opposite side of pouch 150. A belt strap 162 and/or a shoulder strap 164 may be attached to pouch 150 in a known manner so that the pouch, together with the battery therein and the inverter and 12-volt outlet stored in the associated pockets may be worn around the waist of a person or slung over the shoulder for easy portability. Preferably, the combined weight of the portable electric power source in FIGS. 7 and 8 is no more than 5 pounds.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed:

1. A portable electrical energy source, comprising:

a portable housing having an outer surface and defining an interior space;

a direct current battery disposed in the interior space;

a direct current socket supported on the housing and electrically coupled to the battery for supplying direct current from the battery to a device outside the housing;

an inverter for converting direct current into alternating current, the inverter including an electrical lead having a male plug adapted for being electrically connected to the battery via the direct current socket and an electrical outlet for supplying alternating electrical current to a device outside the housing; and attaching means for removably attaching the inverter to the outer surface of the housing so that the inverter can be ported together with the battery inside the housing and selectively separated from the housing and used independently of the battery in the housing.

2. The portable electrical energy source according to claim 1, wherein the battery is a 12 volt DC and further including battery booster cables attached to the battery for extending outside the housing for jump starting a weak battery of a vehicle.

3. The portable electrical energy source according to claim 1, wherein the attaching means slidably receives the inverter on the outer surface of the housing.

4. The portable electrical energy source according to claim 1, wherein the attaching means comprises a snap-on connection between the inverter and the outer surface of the housing.

5. The portable electrical energy source according to claim 1, wherein the attaching means comprises a pocket attached to the outer surface of the housing for removably receiving the inverter.

6. The portable electrical energy source according to claim 1, further including a holder arranged on the outer surface of the housing for stowing the male plug when not in use.

7. The portable electrical energy source according to claim 6, wherein the holder comprises a pocket.

8. The portable electrical energy source according to claim 6, wherein the holder comprises means defining a recess sized to have a friction fit with the male plug for holding the male plug in the recess.

9. The portable electrical energy source according to claim 1, wherein the housing comprises a rigid casing and further comprising a separate panel incorporating the attaching means, and means for fixing the separate panel to the rigid casing.

10. The portable electrical energy source according to claim 1, wherein the housing comprises a bag including a bottom having a rigid support for supporting the battery, the bag further including a top presenting a closable opening and defining an interior space above the battery and below the closable opening for stowing tools.

11. The portable electrical energy source according to claim 10, wherein the bag includes a flexible side wall and the holder comprises a pocket attached to the flexible side wall for removably receiving the inverter.

12. The portable electrical energy source according to claim 10, and further comprising two battery cables connected tot he battery and each having an end including a battery clamp, and the bag includes two holsters arranged in the interior space for stowing the clamps of the battery cables.

13. The portable electrical energy source according to claim 1, wherein the housing, battery and inverter are sized to constitute a belt pack or a belt or shoulder strap, respectively, attached to the housing shoulder bag, and further comprising to assist a person in porting the portable electrical energy source.

14. The portable electrical energy source according to claim 1, and further including a handle attached to the housing to assist in porting the housing by hand.

* * * * *

UNITED STATES PATENT AND TRADEMARK OFFICE
CERTIFICATE OF CORRECTION

PATENT NO. : 5,982,138

DATED : November 9, 1999

INVENTOR(S) : Michael Krieger

It is certified that error appears in the above-identified patent and that said Letters Patent is hereby corrected as shown below:

Column 7, line 7, change "tot he" to --to the--.

Column 8, line 3, after "or"(first occurrence) insert --a shoulder bag, and further comprising--.

Column 8, lines 4 and 5, after "housing" delete --shoulder bag, and further comprising--.

Signed and Sealed this

Eleventh Day of July, 2000

*Attest:*

Q. TODD DICKINSON

*Attesting Officer*       *Director of Patents and Trademarks*

UNITED STATES PATENT AND TRADEMARK OFFICE
CERTIFICATE OF CORRECTION

PATENT NO. : 5,982,138
DATED : November 9, 2004
INVENTOR(S) : Michael Krieger

It is certified that error appears in the above-identified patent and that said Letters Patent is hereby corrected as shown below:

Title page,
Item [73], Assignee, change "Vector Manufacturing, Ltd., Hollywood, Calif." to
-- Vector Manufacturing, Ltd., Hollywood, Fla. --

Signed and Sealed this

Tenth Day of May, 2005

JON W. DUDAS
*Director of the United States Patent and Trademark Office*